US011576418B2

United States Patent
Carbajal et al.

(10) Patent No.: US 11,576,418 B2
(45) Date of Patent: Feb. 14, 2023

(54) VISCOUS FOOD DISPENSING SYSTEM

(71) Applicant: Automatic Bar Controls, Inc., Vacaville, CA (US)

(72) Inventors: Serena Carbajal, Vacaville, CA (US); Gabriel Dial, Vacaville, CA (US); Michael O'Donnell, Vacaville, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 182 days.

(21) Appl. No.: 17/112,943

(22) Filed: Dec. 4, 2020

(65) Prior Publication Data

US 2022/0175012 A1  Jun. 9, 2022

(51) Int. Cl.
| | | |
|---|---|---|
| *A23P 20/15* | (2016.01) | |
| *A21C 9/04* | (2006.01) | |
| *A21D 13/41* | (2017.01) | |
| *B65D 35/28* | (2006.01) | |
| *B05C 5/02* | (2006.01) | |

(52) U.S. Cl.
CPC ............... *A23P 20/15* (2016.08); *A21C 9/04* (2013.01); *A21D 13/41* (2017.01); *B05C 5/02* (2013.01); *B65D 35/28* (2013.01)

(58) Field of Classification Search
CPC .......... A23P 20/15; A21C 9/04; A21D 13/41; B05C 5/02; B05C 11/10; B65D 35/28; B29B 7/22; B67D 1/04; B67D 7/80; B67D 1/1252
USPC .......................................................... 118/24
See application file for complete search history.

(56) References Cited

U.S. PATENT DOCUMENTS

| | | | |
|---|---|---|---|
| 3,198,389 A | | 8/1965 | Dunning |
| 4,639,251 A | * | 1/1987 | Kirkland ................... A61J 1/10 |
| | | | 222/102 |
| 6,892,629 B2 | | 5/2005 | Tuyls et al. |
| 6,892,901 B2 | | 5/2005 | Tuyls et al. |
| 7,074,277 B2 | | 7/2006 | Tuyls et al. |
| 7,581,661 B2 | | 9/2009 | Thomas |

(Continued)

OTHER PUBLICATIONS

Invitation to Pay Additional Fees and, Where Applicable, Protest Fee transmittal dated Feb. 15, 2022 of corresponding International Patent Application No. PCT/US21/72744 (two pages).

(Continued)

*Primary Examiner* — Laura Edwards
(74) *Attorney, Agent, or Firm* — Kilpatrick Townsend & Stockton LLP

(57) ABSTRACT

An apparatus for mixing and dispensing viscous food products is described herein. The apparatus may include a pump device for drawing the viscous food product from a container and distributing over a rotating turntable. The apparatus includes a cassette device with replaceable pliable food containers connected to the pump device through a friction-fit connection. The cassette device includes a sliding roller assembly and a door, with the container installed between the sliding roller assembly and the door such that the roller assembly applies force against the door and container as the sliding roller assembly descends under gravity. The sliding roller assembly includes level indicators visible through the door that provide visual indication of the level of food product remaining within the container.

18 Claims, 11 Drawing Sheets

(56) References Cited

U.S. PATENT DOCUMENTS

| | | |
|---|---|---|
| 7,993,049 B2 | 8/2011 | Tuyls et al. |
| 8,342,367 B2 | 1/2013 | Tuyls et al. |
| 2008/0135426 A1 | 6/2008 | Hecht et al. |
| 2010/0097880 A1 | 4/2010 | Tuyls et al. |

OTHER PUBLICATIONS

International Search Report and Written Opinion of the International Searching Authority dated May 6, 2022 of corresponding International Patent Application No. PCT/US21/72744 (eleven pages).

* cited by examiner

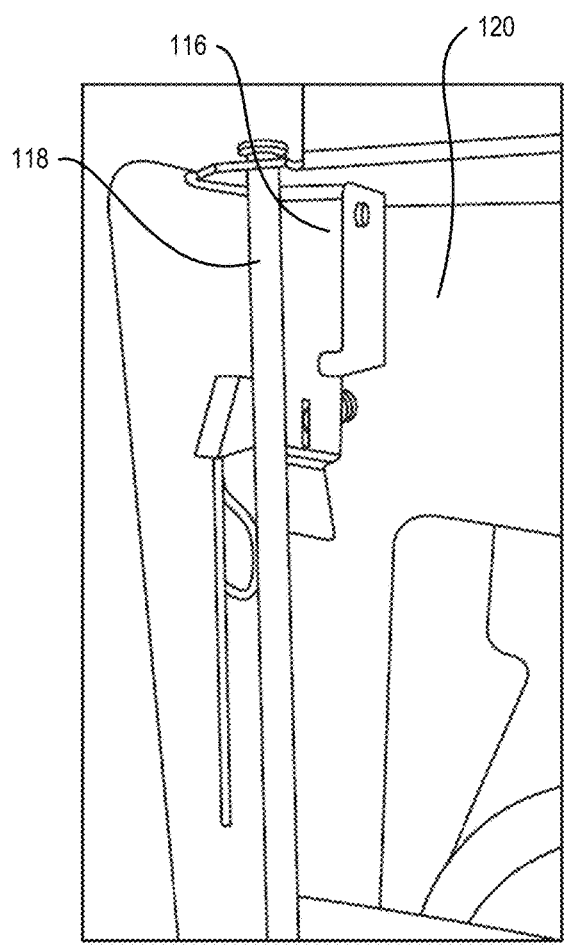
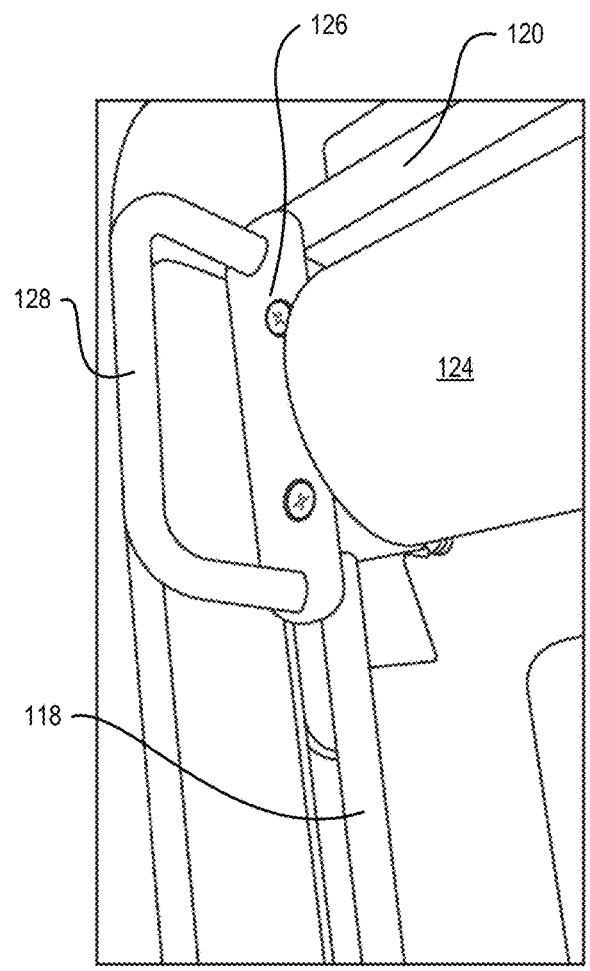
FIG. 8A
FIG. 8B

VISCOUS FOOD DISPENSING SYSTEM

BACKGROUND

Pizza preparation systems provide automated pizza sauce dispensing onto pizza dough. Typical systems use a pre-mixed sauce which often needs replacing, for example when the sauce is used up, or when a different sauce thickness is required. Thus, in order to prepare a variety of pizzas, a different dedicated apparatus must exist for each different variety of pizza. Alternatively, one or a few dispensing apparatuses may be used, but must be prepared and initialized for each variety of pizza. In both cases, changing pizza varieties adds in cost, required space, or down time, all of which are undesirable consequences of changing sauce varieties.

BRIEF SUMMARY

Embodiments provide a system for dispensing viscous food products from a container. The viscous food dispensing system includes a detachable door defining at least one elongated aperture along a vertical axis of the detachable door and attachable to a frame of the viscous food dispensing system by at least one hinge. The viscous food dispensing system also includes an inlet tube connected with a pump device. The viscous food dispensing system also includes a friction-fit connector coupled to the inlet tube. The viscous food dispensing system also includes a container detachably connected to the detachable door, the container containing a viscous food product, the container including an outlet at a bottom of the container configured to couple with the friction-fit connector of the inlet tube via friction fit. The viscous food dispensing system also includes a dispensing device including a roller slideably attached to the frame that applies pressure against the container and the detachable door where the roller is initially in contact with a top of the container and slides towards the outlet as the food product is expelled and a level indicator coupled with the roller that protrudes through the at least one elongated aperture when the detachable door is closed such that the level indicator is visible from an exterior of the detachable door, when the container is disposed between the dispensing device and the detachable door.

One general aspect includes a cassette for supplying a viscous food product. The cassette is reusable and attachable with a pump device. The cassette includes a container detachably connected with the cassette, the container containing a viscous food product, the container including an outlet which is at a bottom of the container configured to couple with the pump device via a friction-fit connector. The cassette also includes a dispensing device including a roller slideably attached to the cassette at each end of the roller and slideably coupled to an exterior of the container to apply pressure against the container against a door of the cassette, wherein as the dispensing device is initially coupled to a top of the container and slides towards the outlet as the food product is expelled. The cassette additionally includes a level indicator coupled with the roller that protrudes through at least one aperture of the cassette when a door of the cassette is closed to provide a level indication of the food product within the container.

One general aspect includes a method of dispensing a viscous food. The method includes raising a roller of a food dispensing system to an upper position of a frame. The method also includes installing a container containing a viscous food product. The method also includes inserting a friction-fit connector of an inlet tube of a pump device of the food dispensing system into an outlet of the container. The method also includes closing a door connected with the frame to position the container between the roller and the door to apply pressure on the container and dispense the food product through the inlet tube.

BRIEF DESCRIPTION OF THE DRAWINGS

Various embodiments in accordance with the present disclosure will be described with reference to the drawings, in which:

FIGS. 8A and 8B show a releasable lock mechanism for securing the roller during installation of a new container, according to at least one example.

DETAILED DESCRIPTION

Embodiments and techniques described herein are directed to systems and methods for dispensing viscous food products, such as pizza sauce, from a container using a dispensing device equipped with a cassette for holding and applying force against the container to remove the food product from the container. Viscous food products are food products that have a tendency to adhere to an interior surface of a container. The apparatus for dispensing viscous food products may, for example, be used to dispense pizza sauce onto a prepared crust of a pizza. The embodiments and techniques described herein provide for easy installation of replaceable food product containers, simple operation, and greater removal of food product from the container resulting in less food waste. Other such food and viscous fluid dispensers including condiment dispensers and the like may include systems and components as described herein.

In the following description, various embodiments will be described. For purposes of explanation, specific configurations and details are set forth in order to provide a thorough understanding of the embodiments; and that the embodiments may be practiced without the specific details. Furthermore, well-known features may be omitted or simplified in order not to obscure the embodiment being described.

Figure 1:
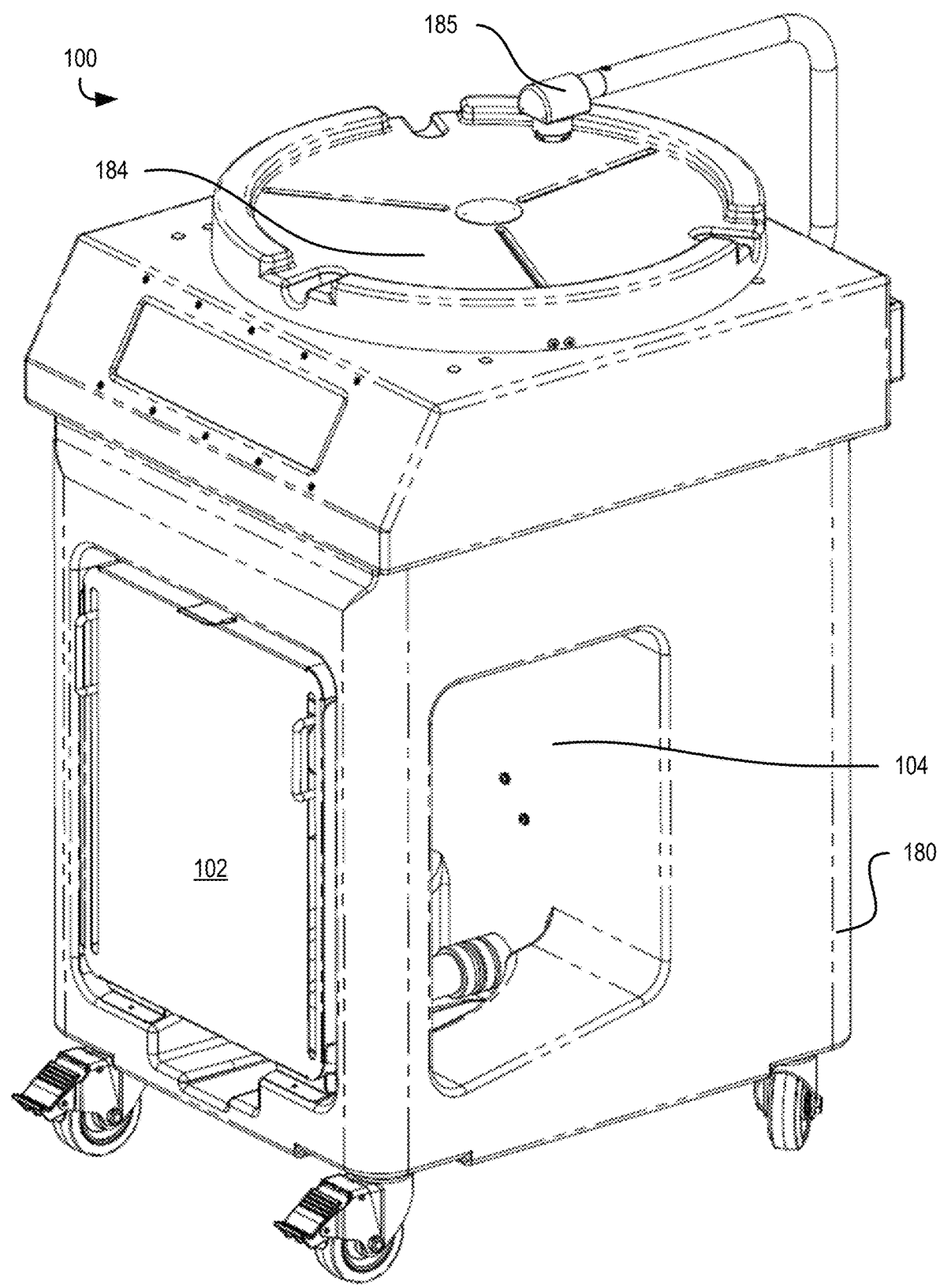
FIG. 1 shows a perspective view of an apparatus for on-demand distribution of a viscous food product, according to at least one example.

FIG. 1 shows a perspective view of an apparatus 100 for on-demand distribution of a viscous food product, according to at least one example. The apparatus 100 includes a base frame 180 constructed in an open tube-frame fashion. The apparatus 100 can have a depth of 24 inches, which is a standard kitchen counter top depth. The apparatus 100 includes a pump device 104 and a cassette device 102. The cassette device 102 supplies concentrated liquid (e.g. viscous) food product in a unique form. The cassette device 102 has several advantages as it requires minimal cleaning, can use pre-packaged concentrated liquid food product in a container as shipped from a factory, includes an indicator showing the level of the concentrated liquid food product remaining in the container, and is configured to couple to one or more different apparatuses. Other devices require concentrated liquid food product to be poured into a container before use. More than one, for example two or more, cassette devices 102 may be used on one apparatus 100. Similarly, one cassette device may be used with more than one, for example two or more, apparatuses at different times. In addition, the cassette device 102 can be re-loaded using pliable food containers without pouring or transferring the food product.

The apparatus 100 includes a table top section 184. The table top section 184 may be formed from a thermo-vacuum formed plastic, molded plastic, and/or sheet metal sections which are welded or bolted together. The table top section 184 also includes a control panel for electronic interaction with the apparatus 100 by a user. A turntable is integrated and rotationally attached to the table top section 184. A round pan holding a dough-based food product (e.g. pizza crust) is intended to sit on top of the turntable. The turntable rotates the pan for even distribution of a viscous food-product onto the dough-based food product.

A control box is attached to the an internal shelf within the apparatus 100. The control box houses control electronics and a fluid interface for connecting to the pump device 104. The apparatus 100 also includes a linear arm 185 which distributes viscous food-product out of a nozzle in an even and smooth manner onto the dough-based food product. The linear arm 185 is actuated by a linear actuator integrated within the table top section 184 The linear arm 185 may be stationary in some examples and connected with the table top section 184. The linear arm 185 is intended to move over and across a radius of the turntable at varying speed, as the outer radius of the turntable will naturally have a higher angular speed than the inner radius at a constant angular speed. The linear arm 185 is also fluidly connected to the pump device 104, which supplies viscous food-product to the linear arm 185.

Figure 7:
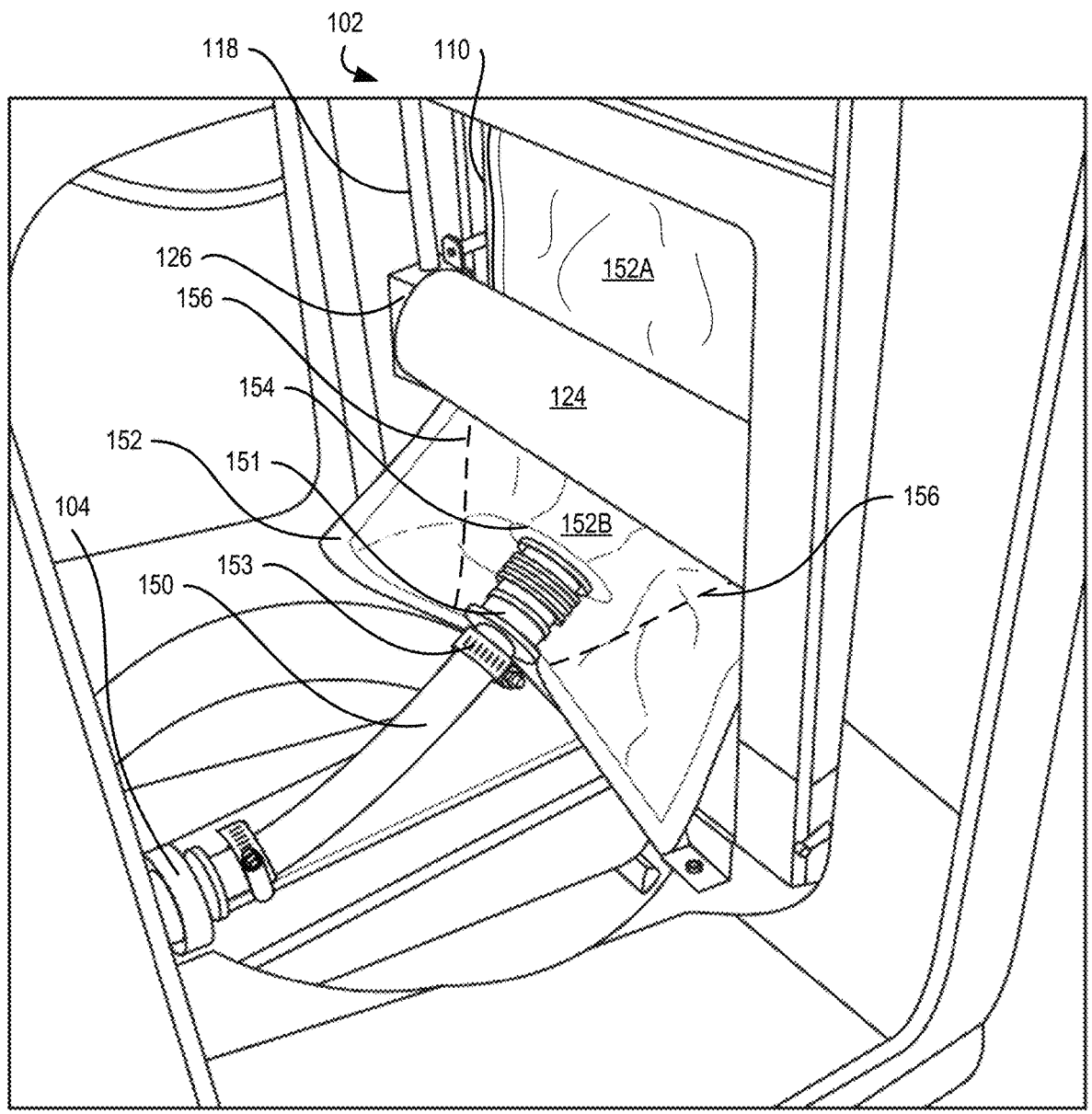
FIG. 7 shows an interior of the apparatus of FIG. 1 illustrating a container connected to a pump device with the roller applying pressure against the container and the door, according to at least one example.

The pump device 104 includes a pump assembly including an electric stepper motor and lead screw. The lead screw actuates a piston, which draws in (by vacuum) the viscous food product into a cylinder from an inlet, as illustrated in FIG. 7, the piston also pressurizes the cylinder through a second piston actuation and forces out the viscous food-product through an outlet and to the linear arm 185. The pump device 104 may also include a pump board which houses electronics for controlling the pump assembly and interfacing with the control box. In some examples, the pump device 104 may be controlled by electronics within the control box. The pump board is in turn controlled by the control box. In some examples, an optional home sensor and limit sensor may be included in the pump device 104 for setting an initial pump position and limiting the travel of the pump, respectively.

In use, a user of the apparatus 100 will first place a container in the cassette device 102 or check to make sure the cassette device 102 includes the viscous food product. The level of the viscous food product included in the cassette device 102 may be determined based on a position of the handles 128 (illustrated in FIG. 3) as visible from an exterior of the cassette device 102.

The user may place a predetermined sized pan (e.g. personal, small, medium, large, extra-large), with a respective sized dough based food-product, onto the turntable. The user then interfaces with the control panel to select pan size and desired sauce depth (e.g. dough type). The turntable rotates and viscous food-product emerges from the linear arm in an even and consistent manner. The linear arm moves along a radius of the turntable, at a varying rate to ensure that the viscous food-product is evenly spread over the surface of the dough based food-product. The linear arm stops dispensing after the viscous food-product has been distributed to a desired consistency. Examples of gripping mechanisms are also shown in co-assigned patents: U.S. Pat. Nos. 6,892,629, 6,892,901, 7,074,277, and 8,342,367, the entirety of which are herein incorporated by reference.

In some examples, the pump device 104 may dilute concentrated liquid food-product stored in cassette device 102. By using a concentrated liquid food-product, the apparatus 100 needs to be refilled less often. Additionally, the apparatus 100, may adjust the mixing ratio of the dispensed sauce by regulating water intake. For example some pizzas require a thicker sauce while others require a thinner sauce. By using a concentrated liquid food-product, thickness changes may occur on-demand by changing and/or controlling a water valve to control a flow of water into the apparatus 100. Previous apparatuses required changing of the entire sauce supply in order to implement a different sauce thickness.

Figure 2:
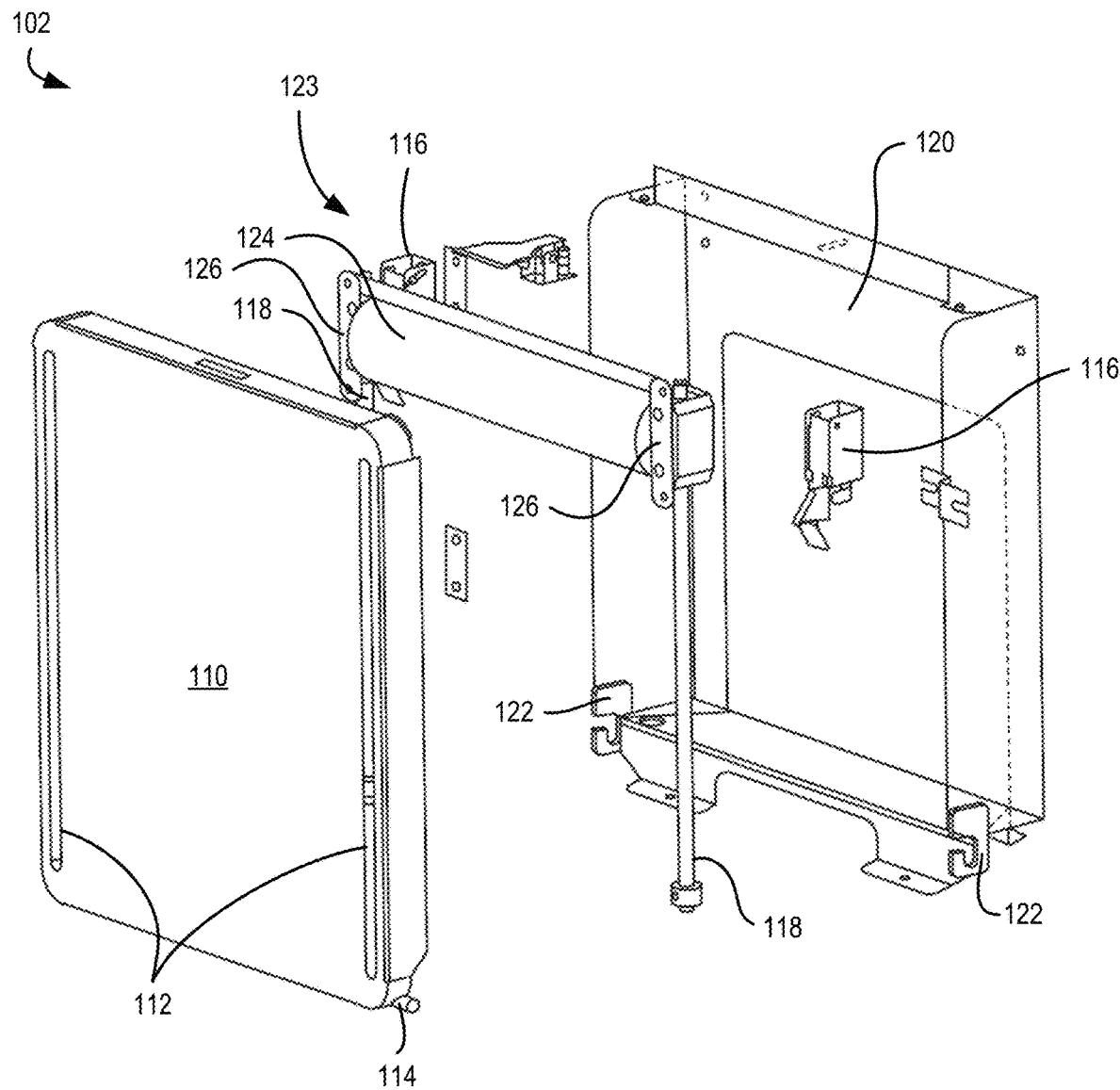
FIG. 2 shows an exploded view of a cassette of the apparatus of FIG. 1, according to at least one example.

FIG. 2 shows an exploded view of a cassette device 102 of the apparatus of FIG. 1, according to at least one example. The cassette device 102 is structured in form of a case, with a door 110 connected by a removable hinge including a first component 114 and a second component 122 to a frame 120. The first component 114 may protrude from a bottom of the door 110. For example, the first component 114 may include a pair of protrusions extending from opposite ends of the bottom of the door 110. The second component 122 may be coupled to a bottom of the frame 120 that mates with the bottom of the door 110. For example, the second component 122 may include a pair of hooks coupled to opposite ends of the bottom of the frame 120, and configured to receive the pair of protrusions extending from the bottom of the door 110.

The frame 120 may further include a dispensing device 123. The dispensing device 123 includes a roller 124, guide shafts 118, locking devices 116, and sliding blocks 126. The roller 124 is connected to sliding blocks 126 which are slidably attached to respective guide shafts 118 extending along the vertical sides of the cassette device 102. The dispensing device 123 is configured to enable the roller 124 to freely slide down the guide shafts 118. The roller 124 is of significant weight, and preferably weighs 6-8 lbs such that the roller 124 descends under its own weight due to gravity to dispense (e.g. squeeze out) the viscous food product from a container. The roller 124 may be weighted with dense materials and/or the roller 124 may be formed of a combination of materials including a high density plastic, a metal, or other such rigid and dense materials. According to some embodiments, the roller 124 may rotate along a horizontal axis extending between the two opposite sliding blocks 126. Alternatively, the roller 124 may be static with respect to the sliding blocks 126.

On each of the sliding blocks 126, handles 128 or protruding elements (illustrated in FIG. 3) may be connected that enable easy movement of the roller 124 by a user, for example to raise the roller 124 to install a new food container in the cassette device 102. The handles 128, shown in FIG. 3 may be configured to protrude through the door 110 to provide a visual indication of the height of the roller 124 within the cassette to provide a fast and easy way to evaluate level marker for the user to visualize and know when the food container must be replaced. The door 110 includes one or more elongated apertures 112, one per each handle 128, or other protrusions from the sliding blocks 126 to protrude when the door 110 is closed and thereby provide the visual level indication without opening the cassette device 102. When the container coupled to the door 110 is full, the roller 124, and the handles 128, will be closer to a top end 190 of the door 110. When the container starts to empty out its contents, the roller 124, and the handles 128, will slide down to gradually get closer to a bottom end 192 of the door 110.

The door 110 of the cassette device 102 also includes hanging devices 113 for connecting to a removable food container and enabling quick connection and replacement of the food container. For example, the hanging devices 113 may include clips, clamps, threaded connections, and other such releasable securements.

The cassette device 102 also includes a pair of locking devices 116 that sit adjacent each of the guide shafts 118. The locking devices 116 serve as retainers configured to release and retain the sliding blocks and therefore interface with the sliding blocks 126 to releasably secure the roller 124 in an upper position closer to the top end 190 of the door 110, for example while replacing the food container. The locking devices 116 may include a latch mechanism that is spring-actuated to support the sliding block 126 when in contact. The locking devices 116 are actuated to release the roller 124 and the sliding blocks 126 to descend along the guide shafts 118. The locking devices 116 may be actuated manually by the user depressing the latch or may be actuated by closing the door 110. As the door 110 is shut, the door depresses the latch of the locking device 116 and releases the sliding block 126. Other hardware shown in FIG. 2 is for mounting of various devices to the frame 120 and securing the frame 120 to the apparatus 100.

Figure 3:
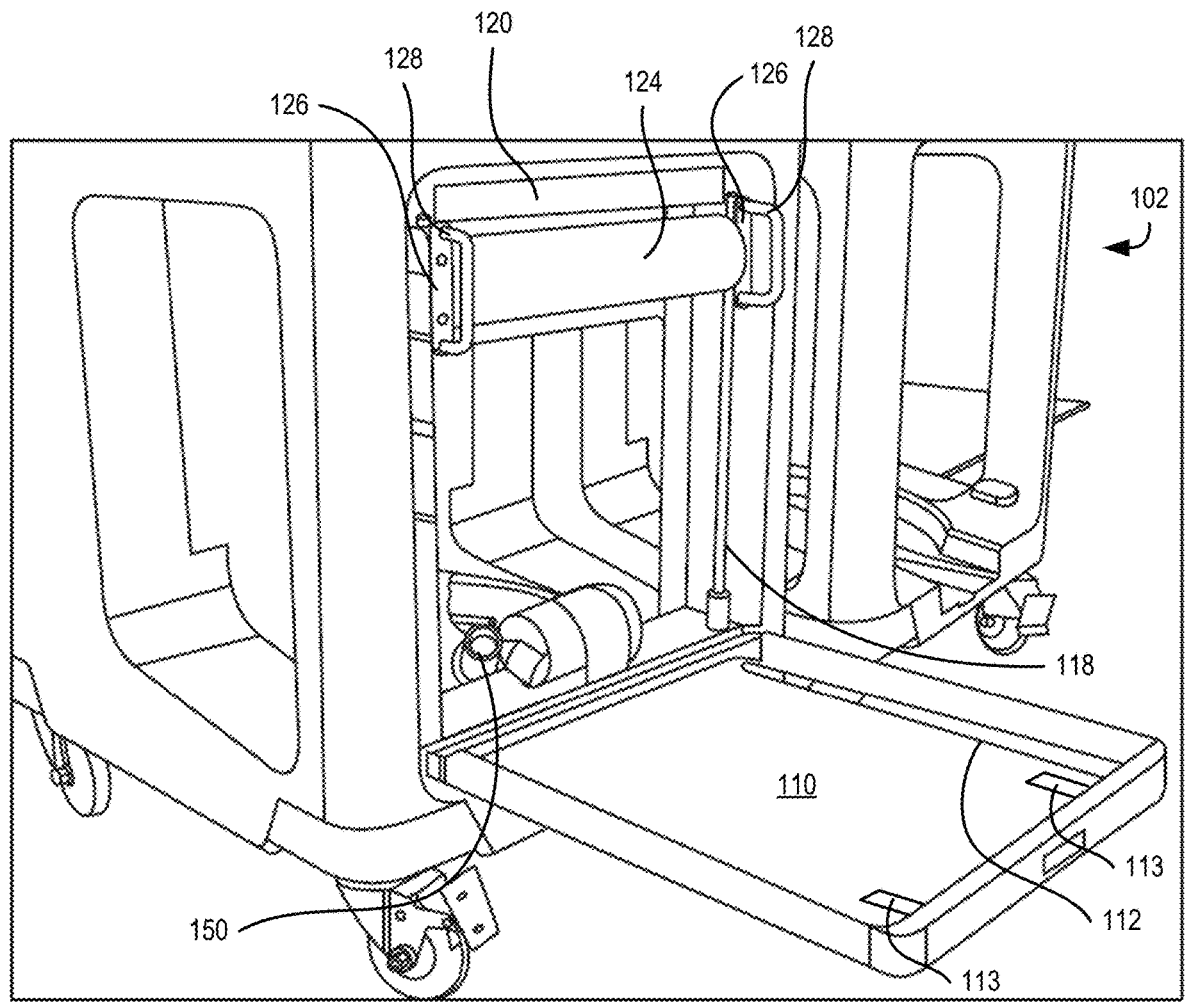
FIG. 3 shows a portion of the apparatus of FIG. 1 showing the cassette installed with a door thereof open, according to at least one example.

FIG. 3 shows a portion of the apparatus 100 of FIG. 1 showing the cassette device 102 installed with a door 110 thereof open, according to at least one example. FIG. 3 shows the cassette device 102 in use. While FIG. 3 shows the cassette device 102 in an open position for illustrative reasons only, normally the cassette device 102 is used in a closed position. In addition to the components described above with respect to FIGS. 1 and 2, FIG. 3 illustrates an inlet 150 for the pump device 104 including a friction-fit connector shown in FIG. 9.

In operation a container, such as a pliable food container bag, is secured to the inside of the door 110 using the hanging devices 113, such as a clip or other securing device at or near a top of the door 110. The roller 124 is raised to the top of the guide shafts 118 and retained in position by the locking devices 116. The roller 124 may be raised by grasping the handles 128 and lifting (e.g. sliding) the roller 124 to the top of the guide shafts 118. The inlet 150 is connected to an outlet of the container, positioned at or near the bottom of the container. The inlet 150 may be connected to the outlet of the container using the friction-fit connector 151 described with respect to FIG. 9. The outlet may be an elastic outlet that stretches to accommodate the friction-fit connector 151 and retain the connection by friction after insertion. The door 110 is then shut and held closed by a door latch or other similar device. When the door 110 is shut, the container is positioned between the roller 124 and the inner surface of the door 110. The roller 124 and the door 110 apply a force against the container (e.g. sandwich the container therebetween). As the door 110 is shut, the locking devices 116 is released to allow the sliding blocks 126 to move freely along the guide shafts 118. The roller 124 may then descend under the force of gravity due to its own weight, applying pressure against the container and pushing the contents of the container toward the outlet of the container. As the roller 124 descends and the container is emptied, the roller 124 forces food product that may adhere to the sides of the interior of the container to descend due to the contact between the roller 124 and the door 110 forcing the food product towards the outlet.

Figure 4:
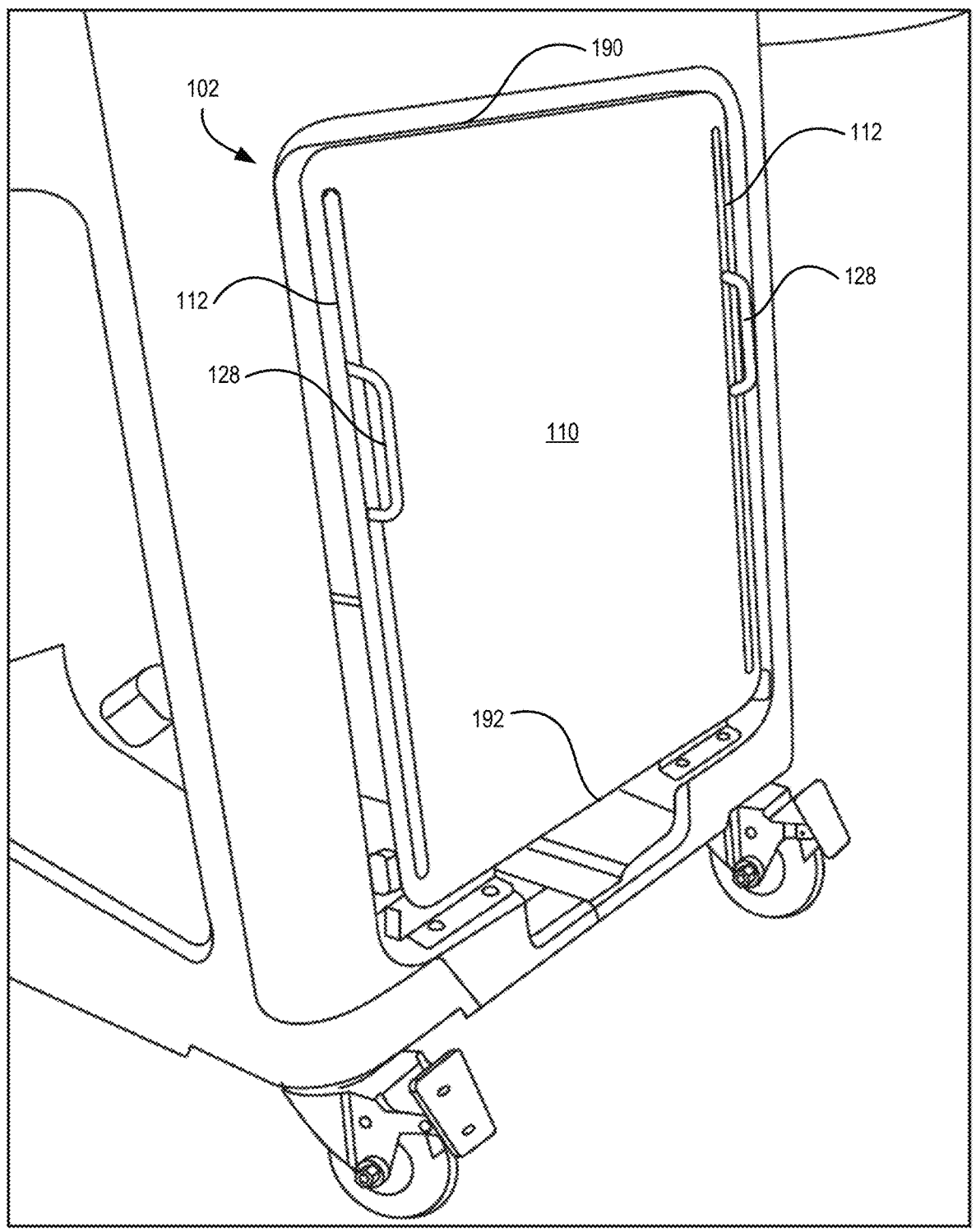
FIG. 4 shows the cassette of the apparatus of FIG. 1 with a level indicator showing a first level of the roller through the closed door, according to at least one example.
Figure 5:
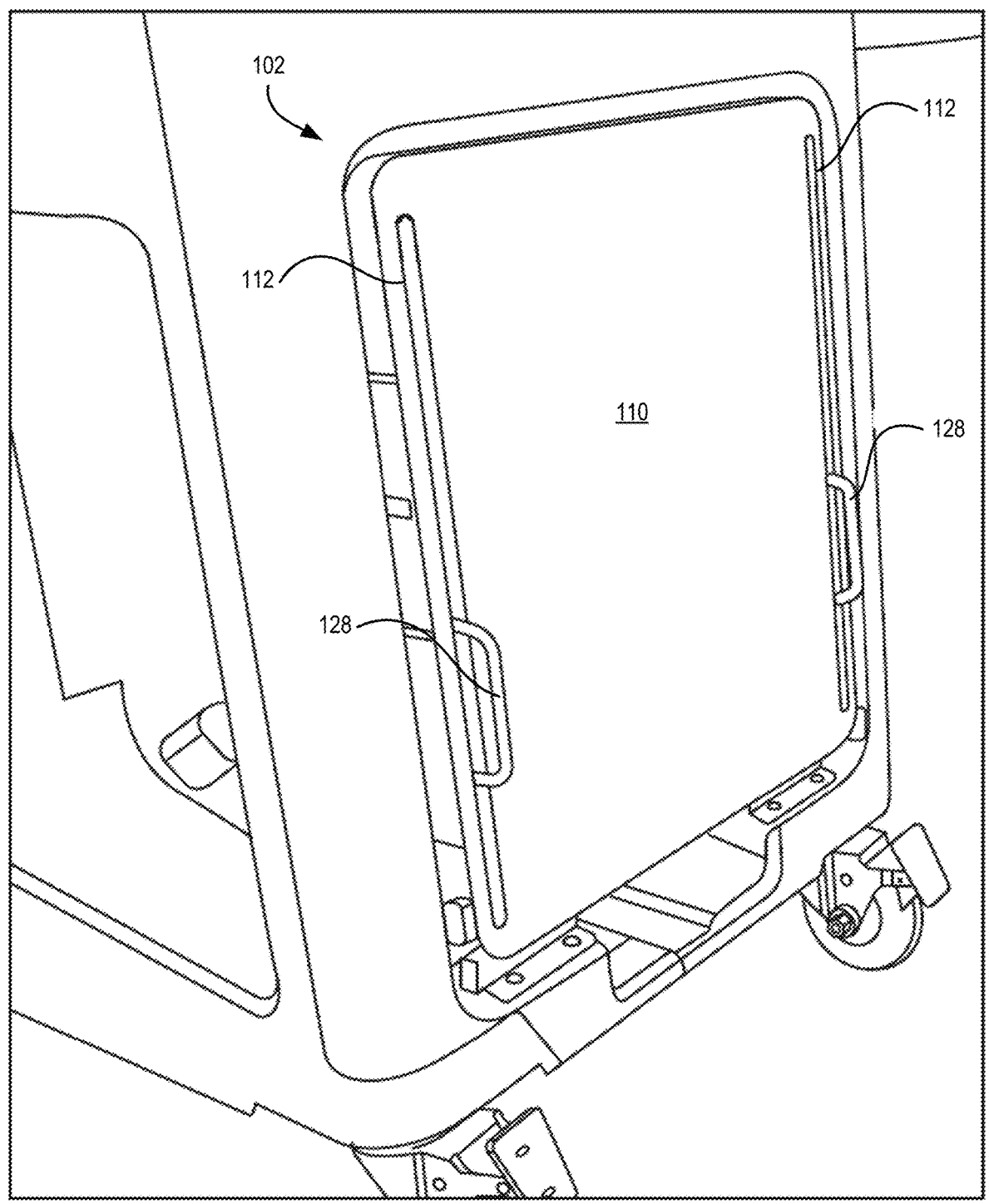
FIG. 5 shows the cassette of FIG. 4 with the level indicator showing a second level of the roller through the closed door, according to at least one example.
Figure 6:
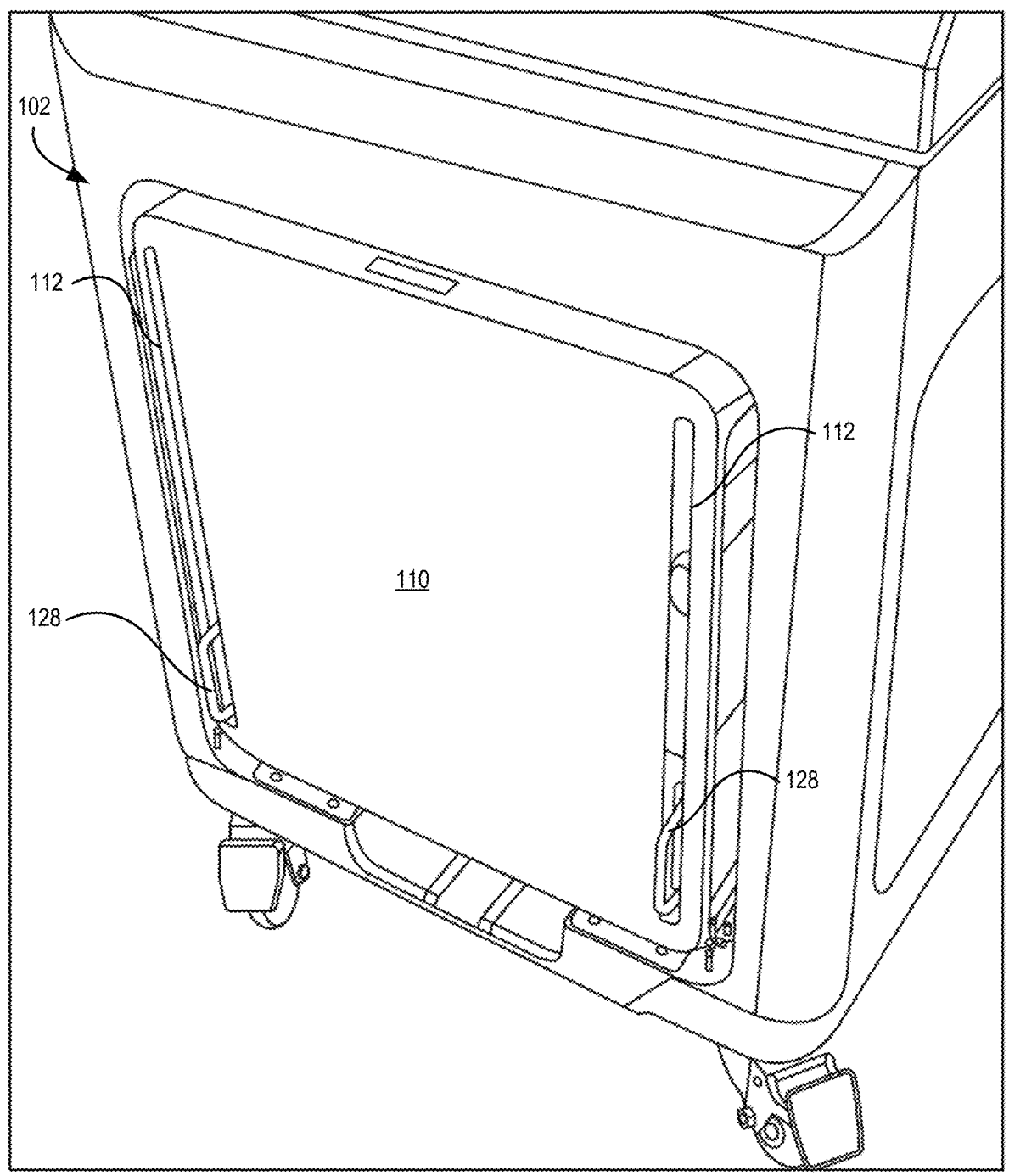
FIG. 6 shows the cassette of FIG. 4 with a level indicator showing a third level of the roller through the closed door, according to at least one example.

FIGS. 4-6 show the cassette device 102 with the door 110 in a closed position and handles 128 extending through the elongated apertures 112 of the door 110 to provide a visual level indication of the food product within the container. As illustrated in FIGS. 4-6, as the container is emptied, due to use of the apparatus 100 and the pump device 104 generates a low-pressure region at the pump device 104 and draws food product from the container 152A/B, the roller 124 descends, forcing the food product towards the exit and ensuring the viscous food product is not left to adhere to the sides of the container and not be drawn out by the pump device 104. The pump device 104 may generate the low-pressure region by pumping food product away from the container 152A/B. While the roller 124 descends, the handles 128, which may also be simple level markers or other visual indicators, descend and provide an indication of the level of food product left within the container. Because the container may be pliable and the food product may be viscous and adhering to the sides of the container, typical level indicator devices may not function to provide a consistent and accurate level determination. In contrast, the roller 124 will descend and apply pressure to the pliable sides of the container and will provide a consistent level reading as food product will be forced downwards by the roller.

Figure 11:
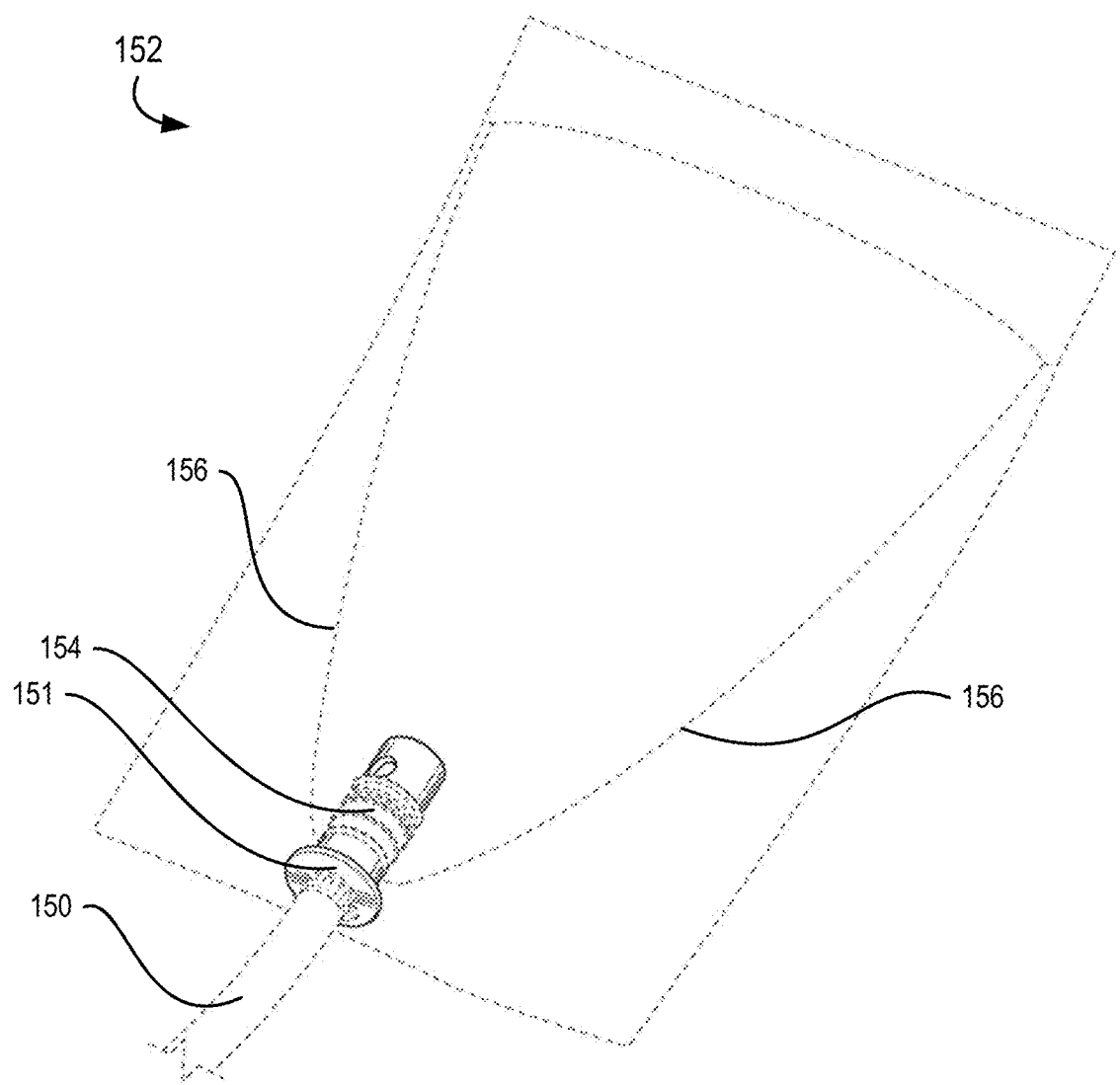
FIG. 11 shows the container of FIG. 7 having an interior funnel shape and connected to the friction-fit connector of FIG. 9, according to at least one example.

FIG. 7 shows an interior of the apparatus of FIG. 1 illustrating a container 152A/B connected to the pump device 104 with the roller 124 applying pressure against the container 152A/B and the door, according to at least one example. The container 152A/B is attached to the door 110. The container 152A/B is constructed from a pliable material, such as plastic. The container 152A/B may have a funnel shape as shown in FIG. 11, from an upper end of the container 152A/B to the bottom of the container 152A/B to guide food product to the outlet 154. The container 152A/B may be a pliable plastic bag. The container 152A/B is attached to securements at the uppermost portion of the container 152A/B and the door 110. The container 152A/B is also placed (e.g. sandwiched) between the roller 124 and the door 110. The portion 152A of container 152A/B above the roller 124 is empty of food product while the remainder 152B of container 152A/B below the roller 124 contains food product. The container 152A/B includes an outlet 154 which attaches to the inlet 150 and the pump device 104 via the friction-fit strainer connector. The container 152A/B contains a concentrated food product that has the tendency to adhere to the interior of the container 152A/B. The concentrated food product is generally very thick and viscous, and will clump unless removed by external force. Thus the weight of the concentrated food product is insufficient to overcome its tendency to clump and will not completely self-expel from the container 152A/B without the pump device 104 and the roller 124. The container 152A/B is connected to the pump device 104 through the inlet 150 that includes a friction-fit connector as shown with respect to FIG. 9. The inlet 150 and/or the outlet 154 may be formed of an elastic material such that the outlet 154 and inlet 150 may interface with a friction-fit connector 151 and prevent disconnection of the inlet 150. The friction-fit connector 151 may be connected to the inlet 150 with a semi-permanent connection, such as using pipe clamp 153 to provide a force to clamp the inlet 150 to a barbed connection 160 (see FIG. 9) of the friction-fit connector 151. The friction-fit connector 151 includes a cylindrical tube 164 (see FIG. 9) that extends toward the interior of the container 152A/B through the outlet 154. The friction-fit of the friction-fit connector 151 and the outlet 154 may result from an unstretched inner diameter of the outlet 154 being smaller than an outer diameter of the friction-fit connector 151 such that when friction-fit connector 151 is inserted into the outlet 154, the outlet 154 stretches to accommodate the friction-fit connector 151 and forms a friction-fit between the two.

The container 152A/B includes seams 156 that form a funnel shape at the bottommost end of the container 152A/B. The seams 156 cause the container to reduce in area at the bottom end of the container 152A/B and ensure that food products is directed towards the outlet 154 rather than potentially becoming trapped in the bottommost corners of the container 152A/B. The seams 156 may be formed in the container by heat sealing the container 152A/B. In some examples, the cassette device 102 may include a funnel-shaped structure at the bottom of the door 110 into which the container 152A/B fits that similarly serves to prevent food product from being trapped in the corners of the container 152A/B.

Figure 9:
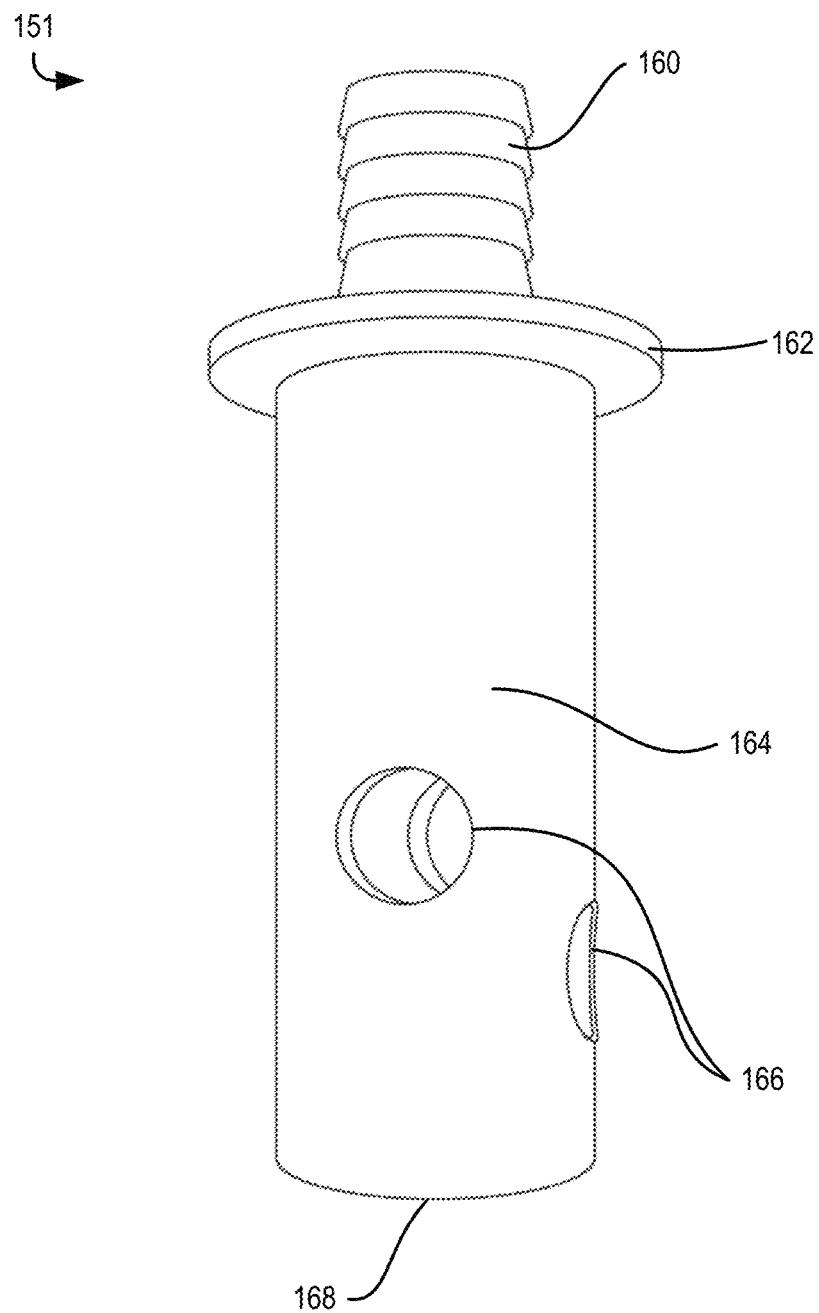
FIG. 9 shows a friction-fit connector for connecting an inlet tube of the pump device of FIG. 7 to the container, according to at least one example.

FIG. 11 shows the container 152 of FIG. 7 having an interior funnel shape and connected to the friction-fit connector 151 of FIG. 9, according to at least one example. The container 152 is a pliable container having interior seams 156 that form the interior funnel shape to direct the viscous food product towards the outlet 154 as the roller 124 descends.

FIGS. 8A and 8B show the locking devices 116 for securing the roller 124 during installation of a new container, according to at least one example. As described above, the locking devices 116 include a latch mechanism that engages with the sliding blocks 126. The locking devices 116 retain the roller 124 in an uppermost position, each of the locking devices 116 retains a corresponding sliding block 126 until released, either by actuating the locking devices 116 manually or by shutting door 110, as described above. Door 110 may include tabs or protrusions to depress the latch of locking device 116 and cause the locking devices 116 to disengage from the sliding blocks 126 so the roller 124 may slide down guide shafts 118 under its own weight.

FIG. 9 shows a friction-fit connector 151 (e.g. friction-fit strainer connector) for connecting an inlet 150 of the pump device 104 of FIG. 7 to the container 152A/B through outlet 154, according to at least one example. The friction-fit connector 151 may be referred to as an inlet suction strainer. The friction-fit connector 151 may be part of the inlet 150 in some examples, such as with an integrally formed connector that is part of inlet 150. The friction-fit connector 151 includes a barbed connection 160 (e.g. a first portion), a stop plate 162, a cylindrical tube 164 (e.g. a second portion), and defines a first opening 168 and a second plurality of openings 166. The barbed connection 160 connects the inlet 150 to a tube coupled to the pump device 104. In some examples the barbed connection may be any other type of tube connection including threaded connections, adhesive connections, friction-fit connections, and the like. The stop plate 162 prevents over insertion of the inlet 150 into the outlet 154 of the container 152A/B. The stop plate 162 also provides a stop position for the tube to connect to the barbed connection 160. The cylindrical tube 164 provides a conduit from the second plurality of openings 166 and the first opening 168 and the tube connected to the barbed connection 160. The first opening 168 may be the primary opening and the second plurality of openings 166 may be secondary openings for funneling the food product from the container toward the pump tube. The secondary openings increase the open surface area in the cylindrical tube 164 and may increase an amount of food product extracted from container 152A/B. The cylindrical tube includes the second plurality of openings 166 in a lateral wall, perpendicular to the axis of the cylindrical tube 164. The first opening 168 is at an end of the cylindrical tube 164. The first opening 168 may provide a passage for food product to exit the container 152A/B. The second plurality of openings 166 may serve to increase a flow rate of food product and/or an amount of food product that may flow through the friction-fit connector 151 by providing a greater open surface area into the inlet 150. Since the pump creates a negative pressure, the cylindrical tube 164 is "sucked" further into the container and reinforces the connection between the friction-fit connector 151 and the container 152A/B. The second plurality of openings 166 are positioned on the lateral wall such that food product that adheres to the interior sides of the container 152A/B may enter inlet 150 through the second plurality of openings 166 which are positioned adjacent the internal walls of the container 152A/B surrounding outlet 154. As food product is funneled towards outlet 154, the food product near or adhering to the inner walls may travel through the second plurality of openings 166 while food product from a central portion of the container 152A/B may enter through the first opening 168.

Figure 10:
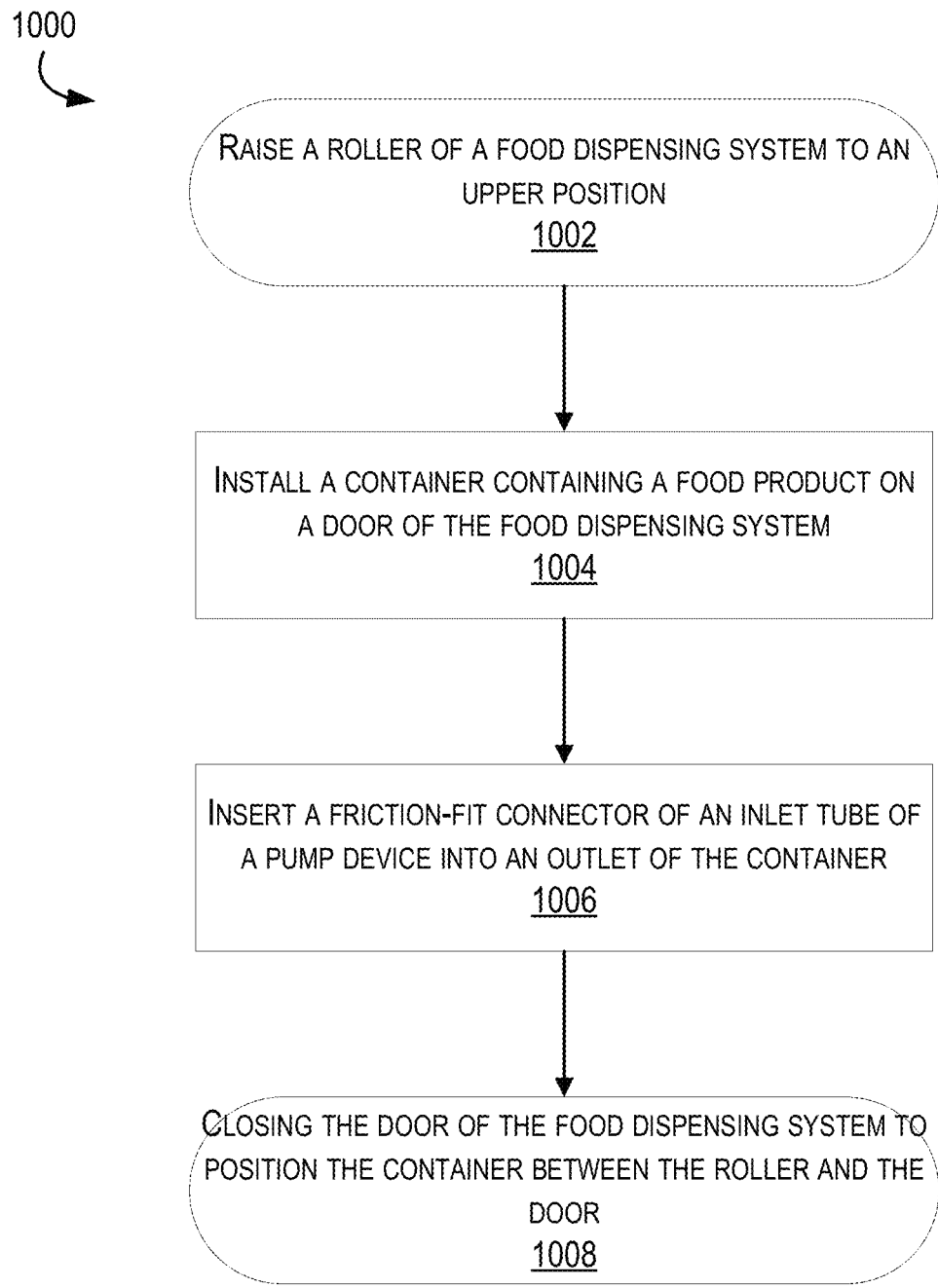
FIG. 10 shows a flowchart of a method for dispensing a viscous food product, according to at least one example.

FIG. 10 shows a flowchart of a method 1000 for dispensing a viscous food product, according to at least one example. The method 1000 may be performed using embodiments described herein, including the apparatus 100, the cassette device 102, and other embodiments described herein.

At 1002, the method 1000 includes raising a roller of a food dispensing system to an upper position. The roller may be the roller 124 that is raised, along guide shafts 118 of the dispensing device 123 to an upper position where the locking devices 116 retain the sliding blocks 126 and support the weight of the roller 124.

At 1004, the method 1000 includes installing a container containing a food product that has a tendency to adhere to an interior surface of the container on a door of the food dispensing system. The container may be the container 152A/B that is pliable and may be flexed and/or compressed to aid in removal of the food product. The container 152A/B is installed by connecting the container 152A/B to the hanging devices 113, for example by clipping the upper edges of the container 152A/B into clips of the hanging devices 113 or otherwise securing the container 152A/B to the door 110.

At 1006, the method 1000 includes inserting a friction-fit connector of an inlet tube of a pump device of the food dispensing system into an outlet of the container. The friction-fit connector may be the friction-fit connector 151 that fits into outlet 154 through a friction-fit as the friction-fit connector 151 stretches the diameter of the outlet 154 due to the friction-fit connector 151 having a larger diameter than an inner diameter of the outlet 154. The friction-fit connector 151 is inserted into the container 152A/B such that openings of the friction-fit connector strain the food product into the inlet 150.

At 1008, the method 1000 includes closing the door 110 of the cassette device 102 to position the container between the roller 124 and the door 110 to apply pressure on the container 152A/B and dispense the food product through the inlet 150. Closing the door 110 may actuate a latch of the locking devices 116 that releases the sliding blocks 126 and enables to roller 124 to descend under its own weight due to gravity. The locking devices 116 are released by the door 110, the roller 124 does not press against the door 110 and descend until released from the upper position where it is held in place by the locking devices 116. The door 110 may be secured in a closed position with a latch or detent such that the force of the roller 124 applying pressure against the container 152A/B and the door 110 does not cause the door 110 to open.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A viscous food dispensing system, comprising:
   a detachable door defining at least one elongated aperture along a vertical axis of the detachable door and attachable to a frame of the viscous food dispensing system by at least one hinge;
   a pump device;
   an inlet tube for the pump device;
   a friction-fit connector coupled to the inlet tube of the pump device;
   a container detachably connected to the detachable door, the container containing a viscous food product, the container including an outlet at a bottom of the container configured to couple with the friction-fit connector of the inlet tube via friction fit; and
   a dispensing device comprising:
     a roller slideably attached to the frame that applies pressure against the container and the detachable door wherein the roller is initially in contact with a top of the container and slides towards the outlet as the viscous food product is expelled; and
     a level indicator coupled with the roller that protrudes through the at least one elongated aperture when the detachable door is closed such that the level indicator is visible from an exterior of the detachable door, when the container is disposed between the dispensing device and the detachable door.

2. The viscous food dispensing system of claim 1, further comprising a retainer connected with the frame that releasably retains the roller at a top of the frame.

3. The viscous food dispensing system of claim 2, wherein the retainer is configured to release the roller when the detachable door is closed.

4. The viscous food dispensing system of claim 1, wherein the friction-fit connector includes a first portion for extending into the inlet tube of the pump device and a second portion for extending into the outlet of the container, wherein the second portion includes a primary opening and one or more secondary openings, the primary opening being disposed at an end of the friction-fit connector and the one or more secondary openings being disposed on a side of the friction-fit connector to enable the viscous food product to exit the container through the friction-fit connector.

5. The viscous food dispensing system of claim 4, wherein the one or more secondary openings increase an amount of viscous food product extracted from the container.

6. The viscous food dispensing system of claim 1, wherein the outlet is an elastic outlet and an outer diameter of the friction-fit connector is greater than an unstretched inner diameter of the outlet.

7. The viscous food dispensing system of claim 1, wherein the container is a pliable plastic bag.

8. The viscous food dispensing system of claim 1, wherein the container has a funnel shape from an upper end of the container to a bottom end of the container adjacent the outlet.

9. The viscous food dispensing system of claim 1, wherein the roller is configured to slide towards the outlet due to gravity acting on the roller.

10. The viscous food dispensing system of claim 1, wherein, the inlet tube comprises a lower pressure region that is configured to draw the friction-fit connector into the inlet tube to reinforce the connection between the inlet tube and the friction-fit connector.

11. A cassette for supplying a viscous food product, comprising:
- a cassette which is reusable and the cassette attached to a pump device, wherein the cassette includes a door;
- a container detachably connected with the cassette, the container containing a viscous food product, the container including an outlet which is at a bottom of the container configured to couple with the pump device, a friction-fit connector coupling the bottom of the container with the pump device; and
- a dispensing device comprising a roller slideably attached to the cassette at each end of the roller and slideably coupled to an exterior of the container to apply pressure against the container against the door of the cassette, wherein as the dispensing device is initially coupled to a top of the container and slides towards the outlet as the viscous food product is expelled,
- wherein the dispensing device additionally includes a level indicator coupled with the roller that protrudes through at least one aperture of the cassette when a door of the cassette is closed to provide a level indication of the viscous food product within the container.

12. The cassette of claim 11, wherein the roller is slidably connected to the cassette with a sliding block slidably connected to a guide shaft of the cassette.

13. The cassette of claim 12, wherein the dispensing device further comprises a retainer that releasably retains the roller at the top of the cassette.

14. The cassette of claim 13, wherein the retainer comprises a latch mechanism at a top end of the guide shaft actuated by closing the door of the cassette.

15. The cassette of claim 11, wherein the friction fit connector comprises a cylindrical tube that fits in the outlet with a first opening at an end of the cylindrical tube and a second opening in a wall of the cylindrical tube.

16. The cassette of claim 15, wherein the outlet is an elastic outlet and an outer diameter of the cylindrical tube is greater than an unstretched inner diameter of the outlet such that the friction fit connector is retained in the outlet by friction after insertion.

17. The cassette of claim 11, wherein the container is detachably connected to the cassette at a top of the door.

18. The cassette of claim 11, wherein the roller is weighted to move due to gravity alone and expel remaining contents of food product that adhere to an interior surface of the container.

* * * * *